(12) United States Patent
Patsenker et al.

(10) Patent No.: US 7,860,919 B1
(45) Date of Patent: Dec. 28, 2010

(54) METHODS AND APPARATUS ASSIGNING OPERATIONS TO AGENTS BASED ON VERSIONS

(75) Inventors: Svetlana Patsenker, Wayland, MA (US); Boris Farizon, Westborough, MA (US); Keith Alan Carson, Jr., Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 707 days.

(21) Appl. No.: 11/731,694

(22) Filed: Mar. 30, 2007

(51) Int. Cl.
*G06F 15/16* (2006.01)
(52) U.S. Cl. .................. 709/201; 709/223; 709/224; 709/232
(58) Field of Classification Search .................. 709/201, 709/223, 224, 232
See application file for complete search history.

(56) References Cited

U.S. PATENT DOCUMENTS

| | | | | |
|---|---|---|---|---|
| 5,832,483 A * | 11/1998 | Barker | ............................ | 707/8 |
| 6,636,599 B1 * | 10/2003 | Mullen | .................. | 379/265.05 |
| 6,952,726 B1 * | 10/2005 | White et al. | ................ | 709/224 |
| 7,234,073 B1 * | 6/2007 | Roytman et al. | ................ | 714/4 |
| 7,457,824 B1 * | 11/2008 | Strom et al. | ............. | 707/104.1 |
| 7,469,284 B1 * | 12/2008 | Dubrovsky et al. | ......... | 709/223 |
| 7,506,336 B1 * | 3/2009 | Ninan | ........................ | 717/175 |
| 2002/0143942 A1 * | 10/2002 | Li et al. | ...................... | 709/225 |
| 2003/0018792 A1 * | 1/2003 | Shiouchi et al. | ............. | 709/229 |
| 2004/0015587 A1 * | 1/2004 | Kogut-O'Connell et al. | ......................... | 709/226 |
| 2004/0220940 A1 * | 11/2004 | Berks et al. | .................. | 707/100 |
| 2005/0083854 A1 * | 4/2005 | Nagarajrao et al. | ......... | 370/254 |
| 2005/0114480 A1 * | 5/2005 | Ramamoorthy | ............. | 709/220 |
| 2007/0005801 A1 * | 1/2007 | Kumar et al. | ............. | 709/238 |
| 2008/0104248 A1 * | 5/2008 | Yahiro et al. | ................ | 709/226 |
| 2008/0140760 A1 * | 6/2008 | Conner et al. | ............... | 709/201 |
| 2008/0147470 A1 * | 6/2008 | Johri et al. | ..................... | 705/9 |

* cited by examiner

*Primary Examiner*—Jefferey F Harold
*Assistant Examiner*—Khaled Kassim
(74) *Attorney, Agent, or Firm*—Chapin IP Law, LLC; Barry W. Chapin, Esq.

(57) ABSTRACT

A system receives notification from an agent of that agent's availability for data collection from resources within a network. The system identifies, from the notification, a version value associated with the agent. The system determines, from the version value, a set of operations to be assigned to the agent that will be compatible with that agent, and assigns a subset of the set of operations to the agent to enable that agent to collect data from resources in the network.

19 Claims, 8 Drawing Sheets

204 DETERMINE, FROM THE VERSION VALUE, A SET OF OPERATIONS TO BE ASSIGNED TO THE AGENT THAT WILL BE COMPATIBLE WITH THAT AGENT

205 COMPARE THE VERSION VALUE RECEIVED IN THE NOTIFICATION FROM THE AGENT TO AN AGENT OPERATIONS STRUCTURE DEFINING OPERATIONS TO BE ASSOCIATED TO DIFFERENT VERSIONS OF AT LEAST ONE AGENT

206 IDENTIFY THE SET OF OPERATIONS WITHIN THE AGENT OPERATIONS STRUCTURE THAT CORRESPOND TO THE VERSION VALUE

207 APPLY A POLICY TO THE SET OF OPERATIONS TO IDENTIFY THE SUBSET OF THE SET OF OPERATIONS TO ASSIGN TO THE AGENT, THE SUBSET OF THE SET OF OPERATIONS IDENTIFIED AS OPERATIONS THAT ARE COMPATIBLE WITH THE VERSION VALUE ASSOCIATED TO THE AGENT

208 IDENTIFY THE POLICY AS A LICENSE RESTRICTING WHICH SUBSET OF THE SET OF OPERATIONS MAY BE ASSIGNED TO THE AGENT

213 COMPARE THE VERSION VALUE RECEIVED IN THE NOTIFICATION FROM THE AGENT TO AN AGENT OPERATIONS STRUCTURE DEFINING OPERATIONS TO BE ASSOCIATED TO DIFFERENT VERSIONS OF AT LEAST ONE AGENT

214 IDENTIFY A NEW SET OF OPERATIONS AVAILABLE TO BE ASSIGNED TO A PLURALITY OF AGENTS

215 ASSOCIATE A NEW VERSION VALUE REQUIRED OF THE PLURALITY OF AGENTS IN ORDER TO BE ASSIGNED THE NEW SET OF OPERATIONS

216 FURTHER RESTRICT THE SUBSET OF OPERATIONS AVAILABLE TO BE ASSIGNED TO THE AGENT, BASED ON:
i) THE VERSION VALUE ASSOCIATED WITH THE AGENT, AND
ii) THE NEW SET OF OPERATIONS AVAILABLE TO BE ASSIGNED TO A PLURALITY OF AGENTS

FIG. 6

217 COMPARE THE VERSION VALUE RECEIVED IN THE NOTIFICATION FROM THE AGENT TO AN AGENT OPERATIONS STRUCTURE DEFINING OPERATIONS TO BE ASSOCIATED TO DIFFERENT VERSIONS OF AT LEAST ONE AGENT

218 COMPARE THE VERSION VALUE RECEIVED IN THE NOTIFICATION FROM THE AGENT TO A RANGE OF VERSION VALUES THAT ARE ASSOCIATED WITH THE SET OF OPERATIONS WITHIN THE AGENT OPERATIONS STRUCTURE

219 IDENTIFY THAT THE RANGE OF VERSION VALUES COMPRISES AT LEAST ONE NULL VARIABLE

220 IDENTIFY THAT THE VERSION VALUE RECEIVED IN THE NOTIFICATION FROM THE AGENT RESIDES BETWEEN THE RANGE OF VERSION VALUES

METHODS AND APPARATUS ASSIGNING OPERATIONS TO AGENTS BASED ON VERSIONS

BACKGROUND

In a storage area network (SAN), a SAN management application monitors and manages manageable entities in the SAN. The manageable entities include storage arrays, connectivity devices, hosts and other resources. Typically, software components known as agents execute on the hosts for gathering, reporting, and monitoring the manageable entities in the SAN. The manageable entities are responsive to the agents for reporting various status metrics back to the agents and receiving control information from the agents. A management server executes the SAN management application, and oversees the agents. The management server is responsive to a console having a graphical user interface (GUI) for receiving and displaying operator parameters with a SAN operator.

The agents periodically collect and transmit management information (collected from resources that those agents manage) to the management application. The management information pertains to the manageable entities that the agent is monitoring, and is employed to update and maintain a managed object database (MODB). The managed object database stores collective information on the manageable entities across the SAN for responding to queries from the management application. Such queries include available storage, used storage, configured and in-use devices, and frequency of usage, for example, and is employed to generate reports on trending analysis, current utilization, usage projections, and other reporting, accounting and maintenance operations.

A conventional SAN management application can also invoke other sub-applications for performing various SAN operations, such as gathering and reporting statistical data in the SAN. The sub-applications are organized as products having features for providing the particular gathering, reporting or control functionality. SAN data gathering, processing, and reporting ranges from broadly characterized to highly detailed, depending on features desired by each particular SAN site (user organization). Typical features include gathering statistics about storage array performance, such as storage capacity used, allocated, available and free within file systems. The agents employ a set of data collection policies to identify the type and frequency of performance data to be gathered. As noted above, this gathered data is stored in a managed object database (MODB) for subsequent usage and querying by the management application. Each of the sub-applications, therefore, is able to provide features by accessing certain types and amounts of data when the storage area network management application establishes and invokes an agent with a particular data collection policy (DCP). As a specific example, a data collection policy assigned to an agent that causes that agent to collect details of file systems on a host can allow the file system data collected by that agent to support a feature purchased by a customer known as "file level reporting" (FLR) that enables a customer to see intricate details of file systems configured within hosts in the storage area network.

SUMMARY

Conventional mechanisms and techniques for maintaining versions of agents that correspond to operations (that those agents can perform) suffer from a variety of deficiencies. In particular, conventional mechanisms and techniques are limited in that there is no efficient mechanism by which to maintain the agent versions and the operations those agents are capable of performing. Typically, a conventional storage area network management software application is hard coded to list the existing agent versions and the corresponding DCPs that map to those agent versions. The constant creation of new operations (such as DCPs) in future releases of the storage area network management application often requires newer versions of agents that are capable of performing those new operations, handling new commands, or collecting new types of data from resources in order to support new storage area network management application features. That is, as new operations are developed, new versions of agents are developed that can utilize the operations to collect data from the manageable entities (i.e., resources) that the agent monitors. The development of new operations can render some versions of agents as obsolete (because those agents cannot collect data according to the new operations). The problem this creates in conventional network management applications is that since the set of data collection policies associated to a particular version of an agent is hard coded into the software code of the application and cannot be easily and dynamically updated by a person in a simple manner. Rather, in conventional applications, when a new feature is built into the software for which a new data collection policy is created, the developers (i.e. programmers) of the conventional storage area network management application must revise and re-write the code the defines what agent versions work with which data collection policies. This code must be re-compiled, tested, debugged and deployed and opens up rooms for errors and is quite time consuming.

Embodiments disclosed herein operate to significantly overcome these and other deficiencies associated with conventional mechanisms and techniques for maintaining versions of agents that correspond to operations, commands, alerts, and data collection policies to be assigned or associated to particular agent types and versions. In particular, embodiments disclosed herein provide an agent compatibility defining and verifying process, operating on a server process, that receives notification from an agent of that agent's availability for data collection from resources within a network. As an example, an agent may indicate it can collect and manage a resource such as a large disk array. The agent notification contains a version value associated with the agent indicating what version (e.g. what software release) is to be associated to that agent. Based on the version value associated with the agent (i.e., the version of the agent operating on that host), the agent compatibility verifying process determines which operations (e.g. alerts, commands and data collection policies) are available to that agent operating that particular version. The agent compatibility verifying process then determines a subset of operations that are compatible with that agent. For example, there may be many operations available to the agent based on the version of the agent. However, that particular agent may be restricted from receiving all of the available operations based on licensing associated with the host on which the agent is operating. The agent compatibility verifying process then assigns the subset of the set of operations (for example, those DCPs the agent is licensed to receive) to that agent. The subset of the set of operations enables the agent to collect data from managed entities (i.e., resources) in the network. In one configuration, after determining those commands, alerts, and data collection policies that are available for that agent, based on the version of that agent, the agent compatibility verifying process may assign all of such operations to that agent (in which case the subset is the entire original set of possible commands, alerts and data collection policies). The agent compatibility verifying process manages backward compatible agents. The SAN management application infrastructure must support older versioned agents. The old agents do not support some new infrastructure features. At the same time, the SAN management application infrastructure must continue to support some of the older agents' features (because of the backward compatibility feature) that are not supported by newly versioned agents. Thus, agent versions are assigned to DCPs/alerts/commands to identify which version of an agent is capable of executing a particular DCP/alert/command.

In an example embodiment, a server process receives the version value from agent, and compares that version value to an agent operations structure that defines the operations to which the agent may be assigned (based on the version value of the agent). In an example embodiment, the agent operations structure is a table within a database that has records containing columns for the version value of the agent, and columns containing the set of operations available to agents operating at those version values. By performing a lookup on the table within the database, the agent compatibility verifying process identifies the set of operations within the agent operations structure that correspond to the version value.

In an example embodiment, the agent compatibility verifying process applies a policy, such as a license, to the set of operations to further restrict those operations the agent is licensed to receive. For example, a host operating the agent may have a license that restricts which of the sets of operations is available to that host. Thus, many operations may be available to an agent based on the agent's version value, but the license associated with the host on which the agent operates may further restrict which of those operations the agent is authorized to receive.

In an example embodiment, the agent compatibility verifying process identifies new set of operations (for example, DCPs) that are available to agents. Based on the capability of a particular versions of agents to operate those new DCPs, the agent compatibility verifying process associates a new version value (or version values) required of the agents to be eligible to operate those new DCPs. In some cases, a version of an agent may be rendered obsolete based on new DCPs (or other operations) that that particular version of agent is not capable of utilizing to collect data.

An agent notifies a server process that the agent is available to collect data. The agent transmits the version value of the agent to the server process. The agent compatibility verifying process, operating on the server process, compares the version value supplied by the agent to a range of version values that are associated with various operations to determine in which version value range the version value associated with the agent resides. In an example embodiment, the range of version value may include a null variable. For example, the version value range may include version values in the range of 'Version X and higher'.

In an example embodiment, the set of operations may include DCPs, alerts and/or commands (to be performed by the agent). Upon receiving notification of the agent's version value from the agent, the agent compatibility verifying process, operating on the server process, responds by transmitting a DCP, alert or comment to the agent.

When a new version of agent has been installed on a host, the agent notifies the agent compatibility verifying process that the agent now has a new version value. The agent compatibility verifying process performs a new look up on the table containing the version value and corresponding set of operations, to determine which new subset of the set of operations should be transmitted to the agent.

The agent compatibility verifying process receives notification from an agent of that agent's availability for data collection from resources within a network. The agent compatibility verifying process identifies, from the notification, a version value associated with the agent. The agent compatibility verifying process determines, from the version value, a set of operations to be assigned to the agent that will be compatible with that agent, and then assigns a subset of the set of operations to the agent to enable that agent to collect data from resources in the network.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be strictly as a software program, as software and hardware, or as hardware alone. The features disclosed herein may be employed in data communications devices and other computerized devices and software systems for such devices such as those manufactured by EMC, Inc., of Hopkinton, Mass.

BRIEF DESCRIPTION OF THE DRAWINGS

The foregoing and other objects, features and advantages disclosed herein will be apparent from the following more particular description of preferred embodiments disclosed herein, as illustrated in the accompanying drawings in which like reference characters refer to the same parts throughout the different views. The drawings are not necessarily to scale, with emphasis instead being placed upon illustrating the embodiments, principles and concepts disclosed herein.

DETAILED DESCRIPTION

A system performs as an agent compatibility verifying process within a data management framework such as within a storage area network management application. The agent compatibility verifying process, operating on a server process, receives notification from an agent of that agent's availability for data collection from resources within a network such as a storage area network and determines a version value associated with the agent. Based on the version value associated with the agent (i.e., the software release or version of the agent operating on that host), the agent compatibility verifying process determines which operations such as data collection policies, alerts and/or commands are available to be assigned to that agent having that particular version. In some cases, that particular agent may be restricted from receiving all of the available operations based on licensing associated with the host on which the agent is operating. The agent compatibility verifying process then assigns the subset of the set of operations (for example, those DCPs, commands and alerts that support features that the customer has licensed) to that agent. The subset of the set of operations enables the agent to collect data from managed entities (i.e., resources) in the network, receive commands to control those resources, and handle alerts.

As older agents operating in customer networks become "out of date", the system disclosed herein allows an administrator to update a file or table or other agent version compatibility data to indicate which operations (commands, data collection policies and alert information) works properly with which versions of which agents. As an example, as agent created in the past become older, the data collection policies that those agent support may become obsolete for supporting certain new features of storage area network management, and thus a specific data collection policy, for example, may have a beginning agent version and a deprecated or ending agent version. This represents a range of agent versions (e.g. agent versions 5.0 through 5.7.2) that, if operating in a storage area network, can be assigned a specific data collection policy. Similar information can be maintained for commands and alerts. Thus, when an agent reports to the server, the server can use the system disclosed herein to determine what operations can be assigned to that agent based on that agent's version. In this manner, only agents that are the proper version are assigned, for example, data collection policies for which they are compatible, and the process of defining which versions of which agents work with which data collection policies, commands and alerts is greatly simplified and less prone to error.

Figure 1:
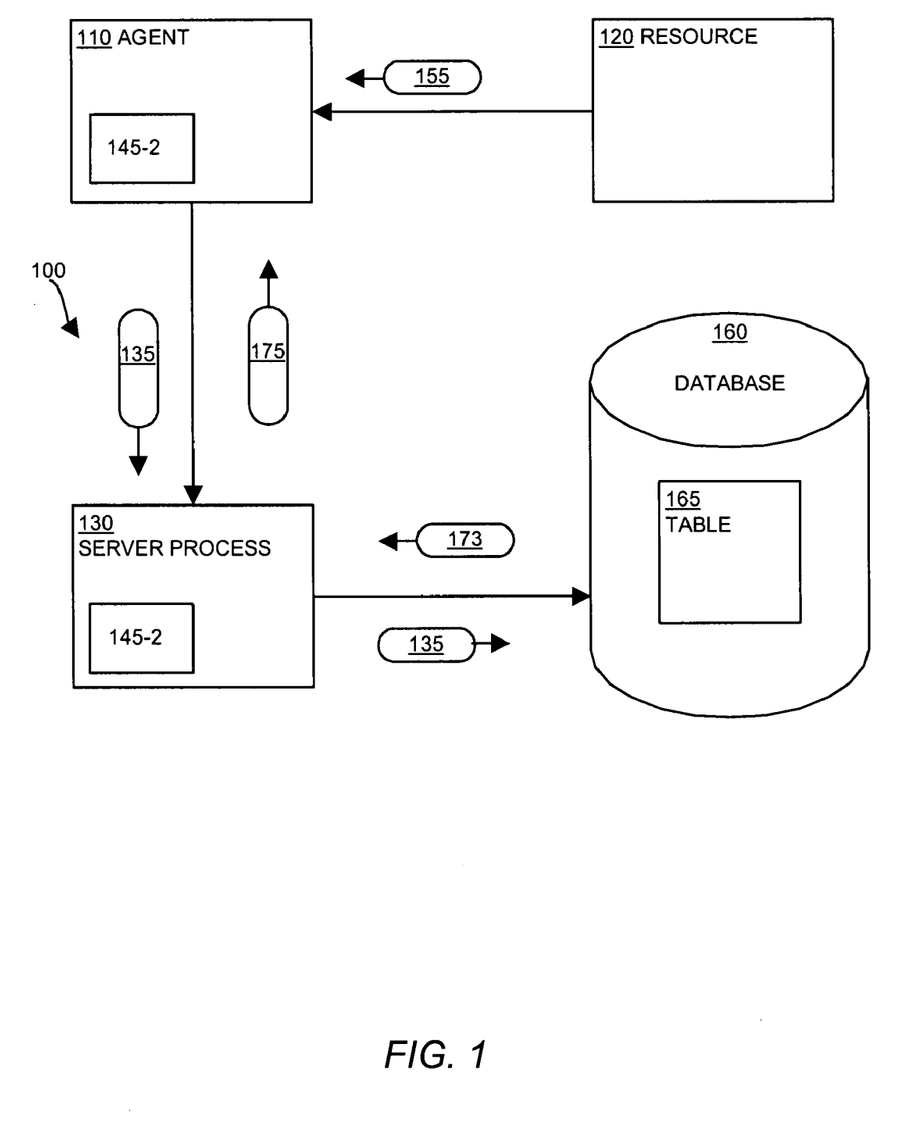
FIG. 1 illustrates an example storage area network and computing system environment including the agent compatibility verifying process configured to operate according to embodiments disclosed herein.

FIG. 1 illustrates an example of a networking environment suitable for use in explaining example embodiments. In this example, the networking environment is a storage area network 100 that includes an agent 110 that receives data 155 from a resource 120 (such as a Symmetrix, etc.). The agent 110 transmits its version value 135 to a server process 130. The agent compatibility verifying process 145-2 (operating on the server 130) performs a look up on a table 165 (within a database 160), using the version value 135, to obtain the set of operations 173 that match the version value 135 of the agent 110. The agent compatibility verifying process 145-2 applies a policy (such as a license) to the set of operations 173 to obtain the subset of the set of operations 175 that the agent 110 is capable of performing.

Figure 2:
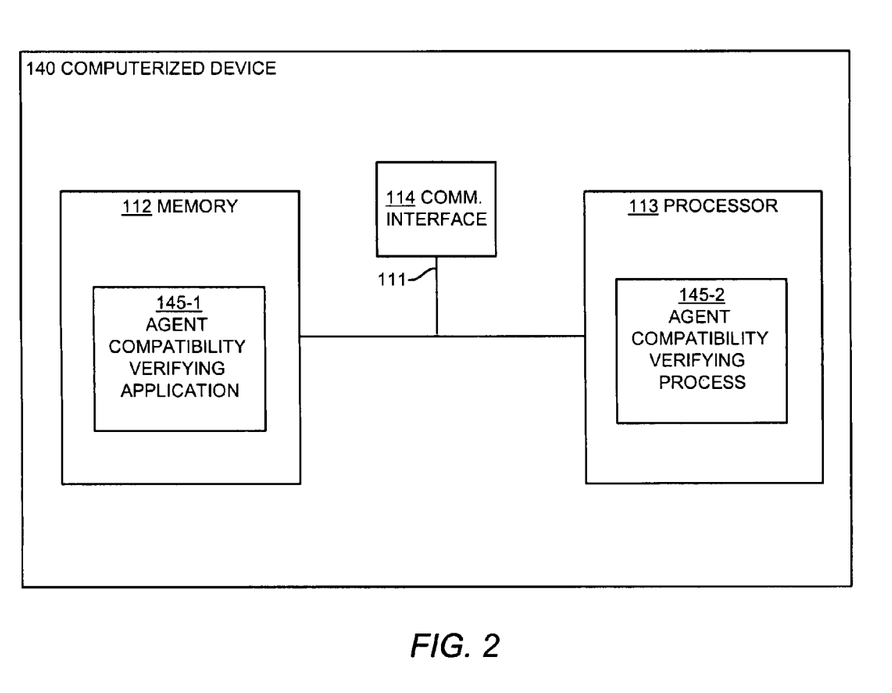
FIG. 2 illustrates an example computer system architecture for a computer system that operates an agent compatibility verifying process in accordance with embodiments disclosed herein.

FIG. 2 illustrates an example architecture of a computerized device 140. The computerized device 140 may be any type of computerized device such as a personal computer, workstation, portable computing device, console, laptop, network terminal or the like. It should be noted that the definition of computerized device 140 encompasses the agent 110, and the server 130. In this example, the computerized device 140 includes an interconnection mechanism 111 that couples a memory system 112, a processor 113, and a communications interface 114. The communications interface 114 enables the computerized device 140 to communicate with other devices (i.e., other computers) on a network (not shown). This can allow access to the agent compatibility verifying process application 145-1 by remote computer systems.

The memory system 112 may be any type of computer readable medium that is encoded with an agent compatibility verifying process application 145-1 that may be embodied as software code such as data and/or logic instructions (e.g., code stored in the memory or on another computer readable medium such as a removable disk) that supports processing functionality according to different embodiments described herein. During operation of the computerized device 140, the processor 113 accesses the memory system 112 via the interconnect 111 in order to launch, run, execute, interpret or otherwise perform the logic instructions of the agent compatibility verifying process application 145-1. Execution of the agent compatibility verifying process application 145-1 in this manner produces processing functionality in an agent compatibility verifying process 145-2. In other words, the agent compatibility verifying process 145-2 represents one or more portions of runtime instances of the agent compatibility verifying process application 145-1 (or the entire application 145-1) performing or executing within or upon the processor 113 in the computerized device 140 at runtime. It is to be understood that embodiments disclosed herein include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 112 (e.g., within random access memory or RAM). It is also to be understood that other embodiments disclosed herein can provide the applications operating within the processor 113 as the processes. While not shown in this example, those skilled in the art will understand that the computer system may include other processes and/or software and hardware components, such as an operating system, that have been left out of this illustration for ease of description.

Further details of configurations explained herein will now be provided with respect to a flow chart of processing steps that show the high level operations disclosed herein to perform the agent compatibility verifying process 145-2.

Figure 3:
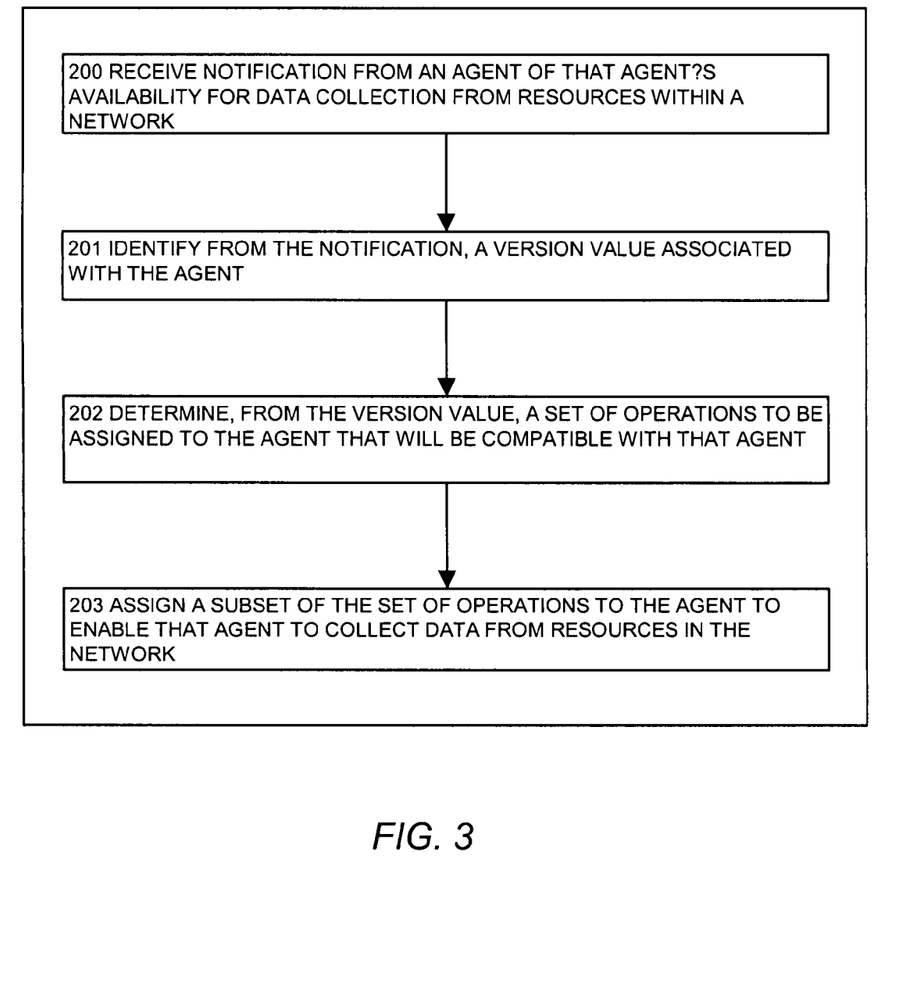
FIG. 3 illustrates a flowchart of a procedure performed by the system of FIG. 1 when the agent compatibility verifying process receives notification from an agent of that agent's availability for data collection from resources within a network, according to one embodiment disclosed herein.

FIG. 3 is a flowchart of the steps performed by agent compatibility verifying process 145-2 when it receives notification from an agent 110 of that agent's 110 availability for data collection from resources 120 within a network.

In step 200, the agent compatibility verifying process 145-2 receives notification from an agent 110 of that agent 110's availability for data collection from resources 120 within a network. When the agent 110 comes online, the agent 110 notifies the server process 130 that the agent 110 is available to collect data 155 from resources 120.

In step 201, the agent compatibility verifying process 145-2 identifies, from the notification, a version value 135 associated with the agent 110. Within the notification sent from the agent 110 to the server process 130, is the version value 135 associated with the agent 110. The agent compatibility verifying process 145-2, operating on the server process 130, identifies the version value 135 associated with the agent 110.

In step 202, the agent compatibility verifying process 145-2 determines, from the version value 135, a set of operations 173 to be assigned to the agent 110 that will be compatible with that agent 110. The agent compatibility verifying process 145-2 obtains the set of operations 173 from a database 160 that is in communication with the server process 130 on which the agent compatibility verifying process 145-2 is operating.

In step 203, the agent compatibility verifying process 145-2 assigns a subset of the set of operations 175 to the agent 110 to enable that agent 110 to collect data 155 from resources 120 in the network. The version value 135 of the agent 110 renders the agent 110 eligible for the set of operations 173 that matches the version value 135. However, there may be additional restrictions on the host on which the agent 110 is operating that limit which of the set of operations 173 the agent 110 may perform. Thus, the agent compatibility verifying process 145-2 determines which subset of the set of operations 175 the agent 110 is eligible to perform, and assigns that subset of the set of operations 175 to the agent 110.

Figure 4:
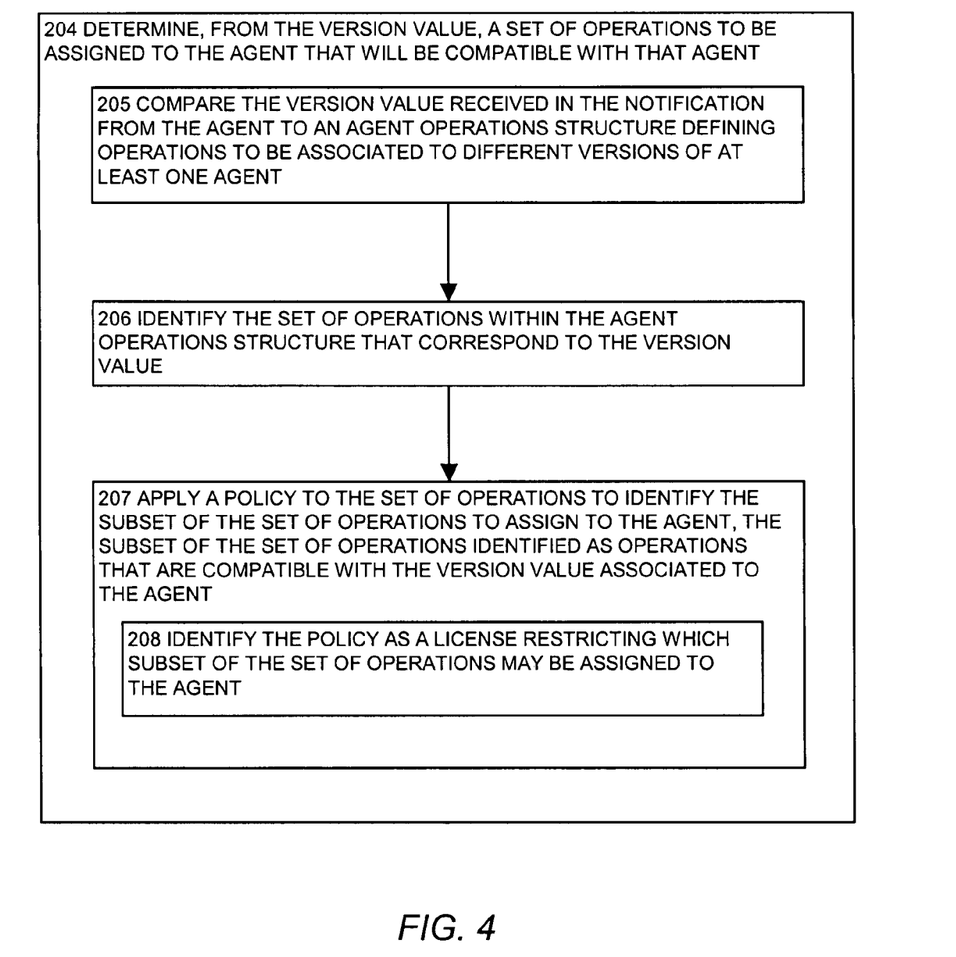
FIG. 4 illustrates a flowchart of a procedure performed by the system of FIG. 1 when the agent compatibility verifying process determines, from the version value, a set of operations to be assigned to the agent that will be compatible with that agent, according to one embodiment disclosed herein.

FIG. 4 is a flowchart of the steps performed by agent compatibility verifying process 145-2 when it determines, from the version value 135, a set of operations 173 to assign to the agent 110 that will be compatible with that agent 110.

In step 204, the agent compatibility verifying process 145-2 determines, from the version value 135, a set of operations 173 to be assigned to the agent 110 that will be compatible with that agent 110. As new operations are developed, agents 110 are updated to be compatible with those operations (i.e., capable of collecting data 155 specified by those operations). Thus, the version value 135 of the agent 110 aids the agent compatibility verifying process 145-2 in identifying which of the set of operations 173 the agent 110 is capable of performing.

In step 205, the agent compatibility verifying process 145-2 compares the version value received in the notification from the agent 110 to an agent operations structure defining operations to be associated to different versions of at least one agent 110. The agent operations structure contains the version values 135 mapped to the set of operations 173 compatible to agents 110 of those version values 135. The agent compatibility verifying process 145-2 compares the version value 135 of the agent 110 to the agent operations structure.

In step 206, the agent compatibility verifying process 145-2 identifies the set of operations 173 within the agent operations structure that correspond to the version value 135. By comparing the version value 135 of the agent 110 to the agent operations structure, the agent compatibility verifying process 145-2 obtains a set of operations 173 that are compatible with that version value 135 of the agent 110. However, additional restrictions on the agent 110 may prevent the agent 110 from being eligible to be assigned all of the operations within the set of operations 173.

In step 207, the agent compatibility verifying process 145-2 applies a policy to the set of operations 173 to identify the subset of the set of operations 175 to assign to the agent 110. The subset of the set of operations 175 is identified as operations that are compatible with the version value 135 associated to the agent 110.

In step 208, the agent compatibility verifying process 145-2 identifies the policy as a license restricting which subset of the set of operations 175 may be assigned to the agent 110. In an example embodiment, the host on which the agent 110 is operating may be limited by a license as to which operations that agent 110 may perform. The agent compatibility verifying process 145-2 applies the license to the set of operations 173 to determine which subset of the set of operations 175 to assign to that particular agent 110.

Figure 5:
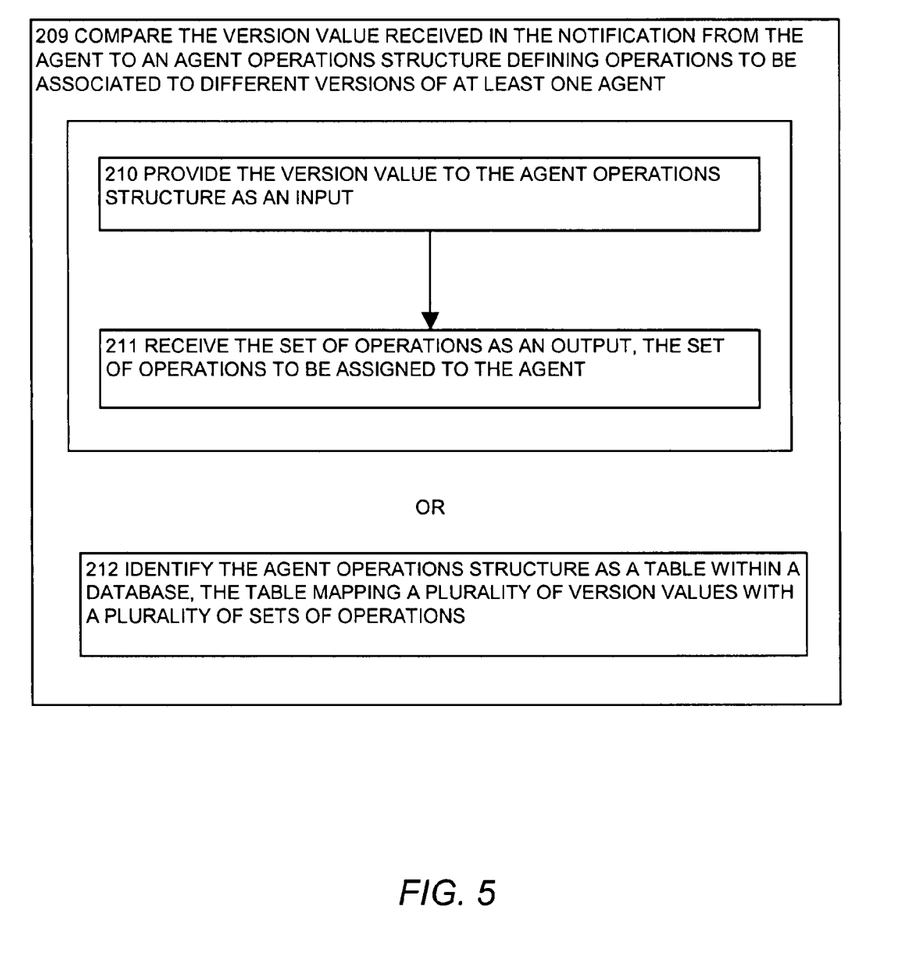
FIG. 5 illustrates a flowchart of a procedure performed by the system of FIG. 1 when the agent compatibility verifying process compares the version value received in the notification from the agent to an agent operations structure defining operations to be associated to different versions of at least one agent, according to one embodiment disclosed herein.

FIG. 5 is a flowchart of the steps performed by agent compatibility verifying process 145-2 when it compares the version value 135 received in the notification from the agent 110 to an agent operations structure defining operations to be associated to different versions of at least one agent 110.

In step 209, the agent compatibility verifying process 145-2 compares the version value received in the notification from the agent 110 to an agent operations structure defining operations to be associated to different versions of at least one agent 110. The agent operations structure contains the version values 135 mapped to the set of operations 173 compatible to agents 110 of those version values 135. The agent compatibility verifying process 145-2 compares the version value 135 of the agent 110 to the agent operations structure.

In step 210, the agent compatibility verifying process 145-2 provides the version value 135 to the agent operations structure as an input.

In step 211, the agent compatibility verifying process 145-2 receives the set of operations 173 (to be assigned to the agent 110) as an output.

Alternatively, in step 212, the agent compatibility verifying process 145-2 identifies the agent operations structure as a table 165 within a database 160. The table 165 maps a plurality of version values 135 with a plurality of sets of operations 173. In an example embodiment, the table 165 may contain one column that contains version values 135 mapped to other columns containing DCPs, alerts, and/or commands.

Figure 6:
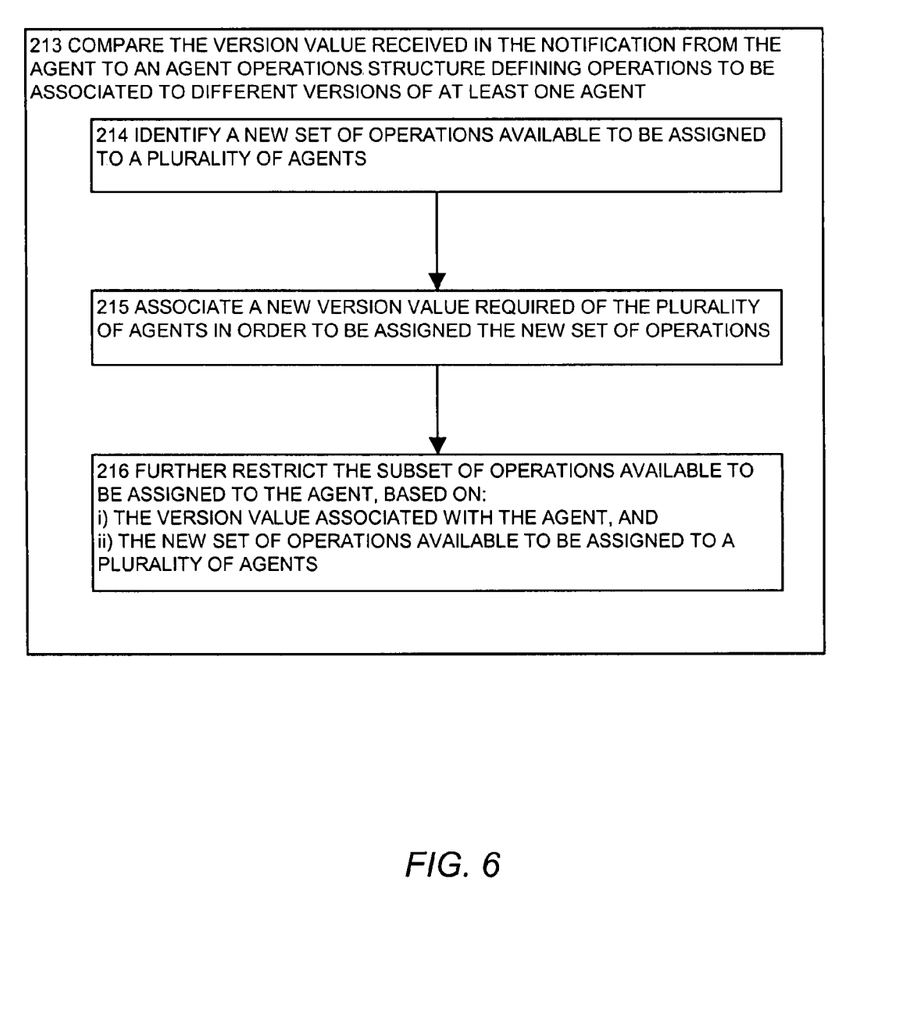
FIG. 6 illustrates a flowchart of a procedure performed by the system of FIG. 1 when the agent compatibility verifying process compares the version value received in the notification from the agent to an agent operations structure, and identifies a new set of operations available to be assigned to a plurality of agents, according to one embodiment disclosed herein.

FIG. 6 is a flowchart of the steps performed by agent compatibility verifying process 145-2 when it compares the version value 135 received in the notification from the agent 110 to an agent operations structure defining operations to be associated to different versions of at least one agent 110.

In step 213, the agent compatibility verifying process 145-2 compares the version value received in the notification from the agent 110 to an agent operations structure defining operations to be associated to different versions of at least one agent 110. The agent operations structure contains the version values 135 mapped to the set of operations 173 compatible to agents 110 of those version values 135. The agent compatibility verifying process 145-2 compares the version value 135 of the agent 110 to the agent operations structure.

In step 214, the agent compatibility verifying process 145-2 identifies a new set of operations 173 available to be assigned to a plurality of agents 110. The collection of data 155 constantly requires agents 110 that are capable of obtaining data 155 at deeper and deeper levels within the resources 120. Thus, new set of operations 173 are constantly developed. As new set of operations 173 are developed, those set of operations 173 are added to the table 165 within the database 160.

In step 215, the agent compatibility verifying process 145-2 associates a new version value 135 required of the plurality of agents 110 to be assigned the new set of operations 173. As new sets of operations 173 are added to the table 165 within the database 160, the agent compatibility verifying process 145-2 identifies which versions of agents 110 are compatible with those new sets of operations 173, and associates those version values 135 with the new sets of operations 173 (in the table 165 within the database 160).

In step 216, the agent compatibility verifying process 145-2 further restricts the subset of the set of operations 175 available to be assigned to the agent 110, based on:
  i) the version value 135 associated with the agent 110, and
  ii) the new set of operations 173 available to be assigned to a plurality of agents 110.

In an example embodiment, the agents 110 may be restricted (to the set of operations 173 to which that agent 110 may be assigned) based on the version value 135 of the agent. Creation of new operations may alter which of the set of operations 173 an agent 110 may be assigned. The development of new set of operations 173 may also render some versions of agents 110 as obsolete.

Figure 7:
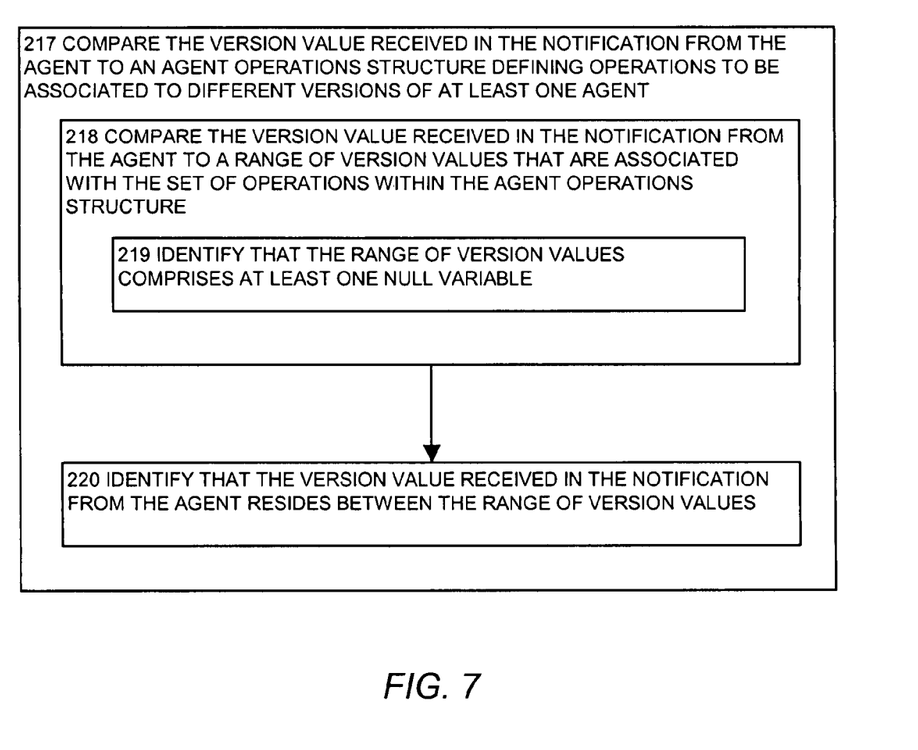
FIG. 7 illustrates a flowchart of a procedure performed by the system of FIG. 1 when the agent compatibility verifying process compares the version value received in the notification from the agent to an agent operations structure, and compares the version value received in the notification from the agent to a range of version values that are associated with the set of operations within the agent operations structure, according to one embodiment disclosed herein.

FIG. 7 is a flowchart of the steps performed by agent compatibility verifying process 145-2 when it compares the version value 135 received in the notification from the agent 110 to an agent operations structure defining operations to be associated to different versions of at least one agent 110.

In step 217, the agent compatibility verifying process 145-2 compares the version value received in the notification from the agent 110 to an agent operations structure defining operations to be associated to different versions of at least one agent 110. The agent operations structure contains the version values 135 mapped to the set of operations 173 compatible to agents 110 of those version values 135. The agent compatibility verifying process 145-2 compares the version value 135 of the agent 110 to the agent operations structure.

In step 218, the agent compatibility verifying process 145-2 compares the version value 135 received in the notification from the agent 110 to a range of version value 135 that are associated with the set of operations 173 within the agent operations structure. In an example embodiment, the table 165 within the database 160 contains a range of version value 135 that are associated with a set of operations 173. For example, a particular set of operations 173 may be associated with agent 110 versions "X through Y".

In step 219, the agent compatibility verifying process 145-2 identifies that the range of version values 135 comprises at least one null variable. In an example embodiment, the version value range may include version values 135 in the range of 'Version X and higher', or "Version Y or lower".

In step 220, the agent compatibility verifying process 145-2 identifies that the version value 135 received in the notification from the agent 110 resides between the range of version values 135. In an example embodiment, the agent compatibility verifying process 145-2 compares the version value 135 of the agent with a version value column within the table 165, and determines that the version value 135 of the agent 110 resides within the version value 135 range specified by that version value column.

Figure 8:
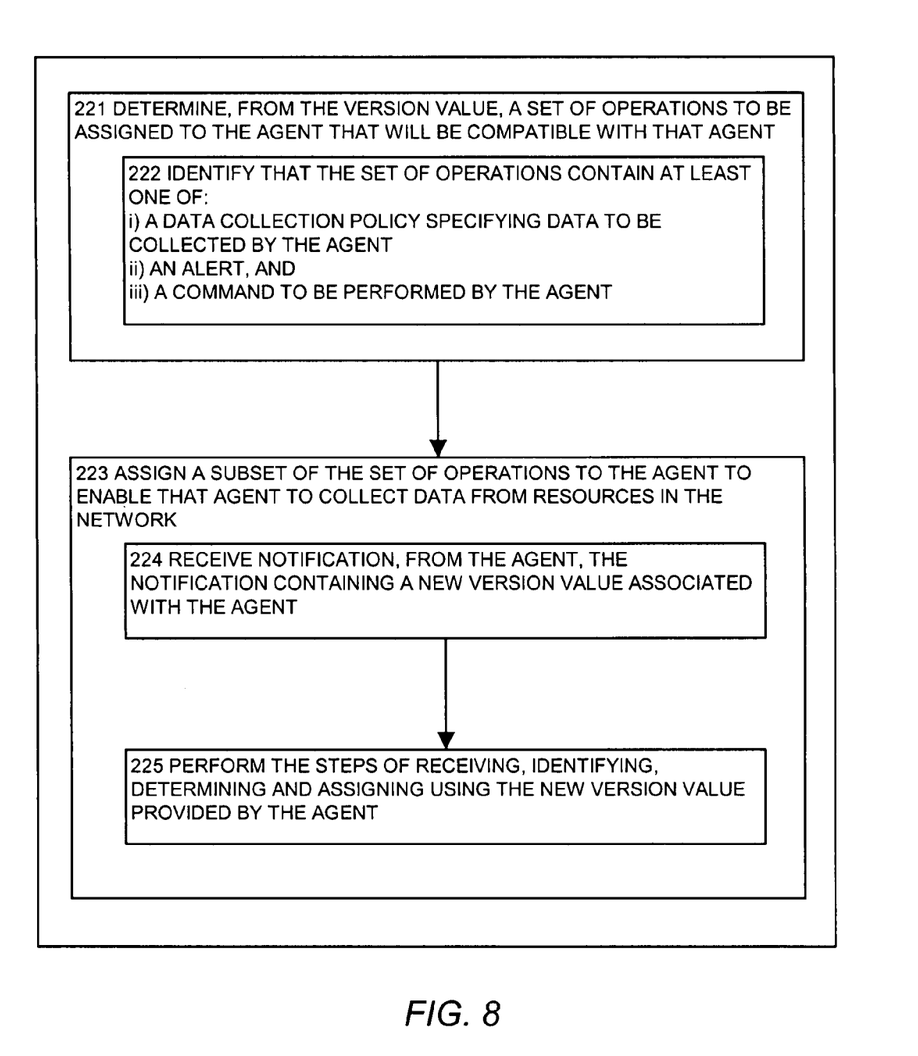
FIG. 8 illustrates a flowchart of a procedure performed by the system of FIG. 1 when the agent compatibility verifying process determines, from the version value, a set of operations to be assigned to the agent that will be compatible with that agent, according to one embodiment disclosed herein.

FIG. 8 is a flowchart of the steps performed by agent compatibility verifying process 145-2 when it determines, from the version value 135, a set of operations 173 to assign to the agent 110 that will be compatible with that agent 110.

In step 221, the agent compatibility verifying process 145-2 determines, from the version value, a set of operations 173 to assign to the agent 110 that will be compatible with that agent 110. The agent compatibility verifying process 145-2 obtains the set of operations 173 from a database 160 that is in communication with the server process 130 on which the agent compatibility verifying process 145-2 is operating.

In step 222, the agent compatibility verifying process 145-2 identifies that the set of operations 173 contain at least one of:
  i) a data collection policy specifying data 155 to be collected by the agent 110,
  ii) an alert, and
  iii) a command to be performed by the agent 110.

In step 223, the agent compatibility verifying process 145-2 assigns a subset of the set of operations 175 to the agent 110 to enable that agent 110 to collect data 155 from resources 120 in the network. The version value 135 of the agent 110 renders the agent 110 eligible for the set of operations 173 that match the version value 135. However, there may be additional restrictions on the host on which the agent 110 is operating that limit which of the set of operations 173 the agent 110 may perform. Thus, the agent compatibility verifying process 145-2 determines which subset of the set of operations 175 the agent 110 is eligible to perform, and assigns that subset of the set of operations 175 to the agent 110.

In step 224, the agent compatibility verifying process 145-2 receives notification, from the agent 110. The notification contains a new version value 135 associated with the agent 110. In an example embodiment, the agent compatibility verifying process 145-2 receives notification that the version value 135 of the agent 110 has modified (for example, a newer version of the agent 110 has been installed on the host).

In step 225, the agent compatibility verifying process 145-2 performs the steps of receiving, identifying, determining and assigning using the new version value 135 provided by the agent 110. The agent compatibility verifying process 145-2 determines a new subset of the set of operations 175 that is compatible with the new version value 135 associated with the agent 110, and assigns that new subset of the set of operations 175 to the agent 110.

Other alternative arrangements disclosed herein include rearranging the processing steps explained above in the flow charts in such a way that the overall effect disclosed herein is the same. It is to be thus understood by those skilled in the art that the particular arrangement of processing steps in many instances does not specify implementation of embodiments disclosed herein. As such, those skilled in the art of software development and computer-related technologies will understand that there can be many ways and orders of representing the processing operations explained above and such alternative software code will still achieve the overall effects explained herein. In addition, embodiments disclosed herein are not limited to operation on the computer systems shown above. The agents, store processes and management server (including change manager) can operate on shared computing resources, or can be distributed among any number of computer systems. Furthermore, embodiments disclosed herein are not limited to operation in a storage area network management application, but are intended to be generally applicable to any type of network management application. Accordingly, embodiments disclosed herein are not limited to the processing arrangements explained above.

Other arrangements of embodiments disclosed herein that are disclosed herein include software programs to perform the method embodiment steps and operations summarized above and disclosed in detail below for the store process. More particularly, a computer program product is disclosed that has a computer-readable medium including computer program logic encoded thereon that when performed in a computerized device provides a associated operations of the store process, as explained herein. The computer program logic, when executed on at least one processor with a computing system, causes the processor to perform the operations (e.g., the methods) indicated herein as embodiments disclosed herein. Such arrangements disclosed herein are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processor s in the computerized device to perform the techniques explained herein as embodiments disclosed herein.

Software processes that operate in a collection of computerized devices, such as in a group of storage area network management servers, hosts or other entities can also provide the system disclosed herein. The system disclosed herein can be distributed between many software processes on several computers, or all processes such as the agent and store process could execute on a small set of dedicated computers, or on one computer alone. Though preferred embodiments provide the agent and store process execute on separate computer systems, the particular distribution of the agent and store process is not intended to be limiting.

It is to be understood that the system disclosed herein can be strictly as a software program, as software and hardware, or as hardware alone. Example embodiments disclosed herein may be implemented within EMC's Control Center software application that provides management functionality for storage area network resources and in computerized devices that operate the Control Center software. Control Center is manufactured by EMC Corporation of Hopkinton, Mass., USA.

While configurations of the system and method have been particularly shown and described with references to configurations thereof, it will be understood by those skilled in the art that various changes in form and details may be made therein without departing from the scope of the invention. Accordingly, the present invention is not intended to be limited by the example configurations provided above.

What is claimed is:

1. A method for collecting data from resources in a storage area network, the method comprising:
   receiving notification from an agent of the agent's availability for data collection from resources within a network;
   identifying, from the notification, a version value associated with the agent;
   determining, from the version value, a set of operations to be assigned to the agent that will be compatible with the agent; and
   assigning a subset of the set of operations to the agent to enable the agent to collect data from resources in the network;
   wherein determining, from the version value, a set of operations to be assigned to the agent that will be compatible with the agent comprises:
      comparing the version value received in the notification from the agent to an agent operations structure defining operations to be associated to different versions of at least one agent; and
      identifying the set of operations within the agent operations structure that correspond to the version value, wherein comparing the version value received in the notification from the agent to an agent operations structure defining operations to be associated to different versions of at least one agent:
   detecting the version value represents a current set of functions the agent can perform;
   upon determining the current set of functions is implemented via a first version of the agent, obtaining at least one first operation to be part of the set of operations, the first operation defined for operability within any agent defined in accordance with the first version; and
   upon determining the current set of functions is implemented via a second version of the agent, obtaining at least one second operation to be part of the set of operations, the second operation defined for operability within any agent defined in accordance with the second version; wherein the agent operations structure provides access to the first operation and the second operation, the first version of the agent and the second version of the agent each comprising different versions of the agent of a same type.

2. The method of claim 1 comprising:
   applying a policy to the set of operations to identify the subset of the set of operations to assign to the agent, the subset of the set of operations identified as operations that are compatible with the version value associated to the agent.

3. The method of claim 2 wherein applying a policy to the set of operations to identify the subset of the set of operations to assign to the agent comprises:
   identifying the policy as a license restricting which subset of the set of operations may be assigned to the agent.

4. The method of claim 1 wherein comparing the version value received in the notification from the agent to an agent operations structure defining operations to be associated to different versions of at least one agent comprises:
   providing the version value to the agent operations structure as an input; and
   receiving the set of operations as an output, the set of operations to be assigned to the agent.

5. The method of claim 1 wherein comparing the version value received in the notification from the agent to an agent operations structure defining operations to be associated to different versions of at least one agent comprises:

identifying the agent operations structure as a table within a database, the table mapping a plurality of version values with a plurality of sets of operations.

6. The method of claim 1 wherein comparing the version value received in the notification from the agent to an agent operations structure defining operations to be associated to different versions of at least one agent comprises:
   identifying a new set of operations available to be assigned to a plurality of agents; and
   associating a new version value required of the plurality of agents in order to be assigned the new set of operations.

7. The method of claim 6 comprising:
   further restricting the subset of operations available to be assigned to the agent, based on:
      i) the version value associated with the agent; and
      ii) the new set of operations available to be assigned to a plurality of agents.

8. The method of claim 1 wherein comparing the version value received in the notification from the agent to an agent operations structure defining operations to be associated to different versions of at least one agent comprises:
   comparing the version value received in the notification from the agent to a range of version values that are associated with the set of operations within the agent operations structure; and
   identifying that the version value received in the notification from the agent resides between the range of version values.

9. The method of claim 1 wherein determining, from the version value, a set of operations to be assigned to the agent that will be compatible with the agent comprises:
   identifying that the set of operations contain at least one of:
      i) a data collection policy specifying data to be collected by the agent;
      ii) an alert; and
      iii) a command to be performed by the agent.

10. A computerized device comprising:
   a memory;
   a processor;
   a communications interface;
   an interconnection mechanism coupling the memory, the processor and the communications interface;
   wherein the memory is encoded with a agent compatibility updating application that when executed on the processor is capable of assigns agent compatibility on the computerized device by performing the operations of:
      receiving notification from an agent of the agent's availability for data collection from resources within a network;
      identifying, from the notification, a version value associated with the agent;
      determining, from the version value, a set of operations to be assigned to the agent that will be compatible with the agent; and
      assigning a subset of the set of operations to the agent to enable that agent to collect data from resources in the network;
   wherein the operation of determining, from the version value, a set of operations to be assigned to the agent that will be compatible with the agent, the computerized device is capable of performing the operation of:
      comparing the version value received in the notification from the agent to an agent operations structure defining operations to be associated to different versions of at least one agent; and
      identifying the set of operations within the agent operations structure that correspond to the version value, wherein comparing the version value received in the notification from the agent to an agent operations structure defining operations to be associated to different versions of at least one agent:
   detecting the version value represents a current set of functions the agent can perform;
   upon determining the current set of functions is implemented via a first version of the agent, obtaining at least one first operation to be part of the set of operations, the first operation defined for operability within any agent defined in accordance with the first version; and
   upon determining the current set of functions is implemented via a second version of the agent, obtaining at least one second operation to be part of the set of operations, the second operation defined for operability within any agent defined in accordance with the second version; wherein the agent operations structure provides access to the first operation and the second operation, the first version of the agent and the second version of the agent each comprising different versions of the agent of a same type.

11. The computerized device of claim 10 wherein the computerized device is capable of performing the operation of:
   applying a policy to the set of operations to identify the subset of the set of operations to assign to the agent, the subset of the set of operations identified as operations that are compatible with the version value associated to the agent.

12. The computerized device of claim 11 wherein when the computerized device performs the operation of applying a policy to the set of operations to identify the subset of the set of operations to assign to the agent, the computerized device is capable of performing the operation of:
   identifying the policy as a license restricting which subset of the set of operations may be assigned to the agent.

13. The computerized device of claim 10 wherein when the computerized device performs the operation of comparing the version value received in the notification from the agent to an agent operations structure defining operations to be associated to different versions of at least one agent, the computerized device is capable of performing the operation of:
   identifying the agent operations structure as a table within a database, the table mapping a plurality of version values with a plurality of sets of operations.

14. The computerized device of claim 10 wherein when the computerized device performs the operation of determining, from the version value, a set of operations to be assigned to the agent that will be compatible with the agent, the computerized device is capable of performing the operation of:
   identifying that the set of operations contain at least one of:
      i) a data collection policy specifying data to be collected by the agent;
      ii) an alert; and
      iii) a command to be performed by the agent.

15. The method of claim 3 wherein identifying the policy as a license restricting which subset of the set of operations may be assigned to the agent comprises:
   determining the policy based on a host on which the agent resides wherein the license associated with the host restricts which subset of the set of operations may be assigned to the agent.

16. The method as in claim 1, comprising:
   wherein receiving notification from the agent includes:
      receiving a notification that a first available agent has a new version value, the notification sent from the first available agent;

wherein identifying the version value associated with the agent includes: identifying that a current software state of the first available agent is represented by the new version value of the first available agent, the new version value different than a previous version value representing a previous software state of the first available agent;

wherein determining the set of operations to be assigned to the agent includes: identifying a new operation associated with the new version value, the new operation inoperable with the previous software state of the first available agent; and wherein assigning the subset of the set of operations to the agent includes: transmitting the new operation to the first available agent.

17. The method as in claim 16, wherein transmitting the new operation to the first available agent includes:

transmitting a data collection policy the first available agent could not have implemented in the previous state.

18. The method as in claim 1, wherein receiving notification from the agent includes:

receiving a notification that a first available agent has a new version value, the notification sent from the first available agent.

19. A non-transitory computer readable storage medium comprising executable instructions encoded thereon operable on a computerized device to perform processing comprising instructions for:

receiving notification from an agent of the agent's availability for data collection from resources within a network;

identifying, from the notification, a version value associated with the agent;

determining, from the version value, a set of operations to be assigned to the agent that will be compatible with the agent; and assigning a subset of the set of operations to the agent to enable the agent to collect data from resources in the network;

wherein determining, from the version value, a set of operations to be assigned to the agent that will be compatible with the agent comprises:

comparing the version value received in the notification from the agent to an agent operations structure defining operations to be associated to different versions of at least one agent; and identifying the set of operations within the agent operations structure that correspond to the version value, wherein comparing the version value received in the notification from the agent to an agent operations structure defining operations to be associated to different versions of at least one agent:

detecting the version value represents a current set of functions the agent can perform;

upon determining the current set of functions is implemented via a first version of the agent, obtaining at least one first operation to be part of the set of operations, the first operation defined for operability within any agent defined in accordance with the first version; and upon determining the current set of functions is implemented via a second version of the agent, obtaining at least one second operation to be part of the set of operations, the second operation defined for operability within any agent defined in accordance with the second version; wherein the agent operations structure provides access to the first operation and the second operation, the first version of the agent and the second version of the agent each comprising different versions of the agent of a same type.

* * * * *